(12) United States Patent
Kramer

(10) Patent No.: US 6,400,100 B1
(45) Date of Patent: *Jun. 4, 2002

(54) SYSTEM AND METHOD FOR DETERMINING THE FREQUENCY OF LONGITUDINAL MODE REQUIRED FOR COLOR MIXING IN A DISCHARGE LAMP

(75) Inventor: Jerry Kramer, Yorktown Heights, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/620,357

(22) Filed: Jul. 20, 2000

(51) Int. Cl.[7] .................................................. G05F 1/00

(52) U.S. Cl. ........................ 315/291; 315/246; 315/194

(58) Field of Search ................................. 315/219, 291, 315/307, 224, 209 R, 308, 246, DIG. 7, 174, 194, 326

(56) References Cited

U.S. PATENT DOCUMENTS

| | | | | |
|---|---|---|---|---|
| 5,569,984 A | | 10/1996 | Holtslag | 315/307 |
| 5,684,367 A | * | 11/1997 | Moskowitz | 315/246 |
| 5,859,505 A | | 1/1999 | Bergman et al. | 315/307 |
| 6,005,356 A | * | 12/1999 | Horiuchi et al. | 315/307 |
| 6,184,633 B1 | * | 2/2001 | Kramer | 315/246 |

* cited by examiner

*Primary Examiner*—Don Wong
*Assistant Examiner*—Ephrem Alemu

(57) ABSTRACT

In a power source system, a method for providing color mixing in a high intensity discharge (HID) lamp comprises the steps of providing a swept frequency signal having a sweeping frequency ranging between a first lower frequency value and a second higher frequency value, within a specified period. An amplitude modulation signal is also provided having an adjustable frequency value and an adjustable modulation index. As a result the sweeping frequency signal is modulated by said amplitude modulation signal. The frequency of the amplitude modulation signal is adjusted until a maximum lamp voltage is detected. Thereafter, the system operates with a modulating frequency that yields the maximum lamp voltage so as to substantially eliminate color segregation in the lamp.

33 Claims, 9 Drawing Sheets

SYSTEM AND METHOD FOR DETERMINING THE FREQUENCY OF LONGITUDINAL MODE REQUIRED FOR COLOR MIXING IN A DISCHARGE LAMP

BACKGROUND OF THE INVENTION

This invention relates to color mixing in gas discharge lamps and more specifically to a system and method for determining the frequency of a second longitudinal mode signal provided to a gas discharge lamp.

High intensity discharge lamps (HID) are becoming increasingly a popular because of their many advantages, such as high efficacy and brightness, compared to other types of low pressure mercury vapor flourescent lamps. These HID lamps can be driven by a high frequency electronic ballast that is configured to generate driving current signals at above 20 kHz range.

A major obstacle to the use of high frequency electronic ballasts for HID lamps, however, is the acoustic resonances/arc instabilities which can occur at high frequency operation. Acoustic resonances, at many instances, can cause flicker of the arc which is very annoying to humans. Furthermore, acoustic resonance can cause the discharge arc to extinguish, or even worse, stay permanently deflected against and damage the wall of the discharge lamp.

Recently, a new class of high intensity discharge lamps has been developed that employ ceramic (polycrystalline alumina) envelopes. The discharge envelope in this class of lamps is cylindrical in shape, and the aspect ratio, i.e., the inner length divided by the inner diameter is close to one, or in some instances more than one. Typically, lamps with aspect ratios much greater than one have the desirable property of higher efficacy, but they have the disadvantage of having different color properties in vertical and horizontal operation. In particular, in vertical operation color segregation occurs.

The color segregation can be observed by projecting an image of the arc onto a screen, which shows that the bottom part of the arc appears pink, while the top part appears blue or green. This is caused by the absence of complete mixing of the atomic metal additives in the discharge. In the upper part of the discharge there is excessive thallium and mercury emission and insufficient sodium emission. This phenomena leads to higher color temperature and decreased efficacy compared to horizontal operation.

U.S. application Ser. No. 09/335,020 entitled Reduction of Vertical Segregation In a Discharge Lamp, filed Jun. 17, 1999, and incorporated herein by reference, now U.S. Pat. No. 6,184,633 teaches a method to eliminate or substantially reduce arc instabilities and color segregation, by providing a current signal frequency sweep within a sweep time, in combination with an amplitude modulated signal having a frequency referred to as second longitudinal mode frequency. The typical parameters for such operation are a current frequency sweep from 45 to 55 kHz within a sweep time of 10 milliseconds, a constant amplitude modulation frequency of 24.5 kHz and a modulation index of 0.24.

The modulation index is defined as $(V_{max}-V_{min})/(V_{max}+V_{min})$, where $V_{max}$ is the maximum peak to peak voltage of the amplitude modulated envelope and $V_{min}$ is the minimum peak to peak voltage of the amplitude modulated envelope. The frequency range of 45 to 55 kHz is between the first azimuthal acoustic resonance mode frequency and the first radial acoustic resonance mode frequency. The second longitudinal mode resonance frequency is then derived mathematically, where the power frequency of the $n^{th}$ longitudinal mode resonance is equal to $n*C_1/2L$ where n is the mode number, $C_1$ is the average speed of sound in the axial plane of the lamp and L is the inner length of the lamp. However, it is not possible to calculate accurately the second longitudinal mode resonance frequency of a given lamp, because of small variations in $C_1$ caused by temperature variations in the lamp. In addition, small differences in L can occur because of manufacturing tolerances.

Therefore, despite the remarkable teachings of the above-identified application, there is a need for an improved system and a method to determine the second longitudinal mode frequency of the signal that is provided to the discharge lamp in a convenient and accurate manner.

SUMMARY OF THE INVENTION

In accordance with one embodiment of the invention, a high intensity discharge lamp is operated through a current frequency sweep within a sweep time, in combination with an amplitude modulated signal having a frequency corresponding to the second longitudinal acoustic resonance mode of the discharge lamp. The second longitudinal mode frequency, $f_Y$, is derived by first setting a lower limit second longitudinal mode frequency $f_L$, and an upper limit second longitudinal mode frequency $f_H$. The gas discharge lamp is then provided with a current signal that has a frequency sweep ranging between the first azimuth acoustic resonance mode frequency and the first radial acoustic resonance mode frequency, respectively corresponding to the first azimuthal acoustic resonance mode of the lamp and the first radial acoustic resonance mode of the lamp.

The frequency swept current signal is then amplitude modulated with a signal having frequency $f_H$ and a specified modulation index a. The lamp voltage is then measured. The amplitude modulated frequency $f_H$ is then decreased by a specified amount $\Delta f$ and then mixed again with the frequency swept current signal. The lamp voltage is repeatedly measured until the frequency of the amplitude modulated signal reaches $f_L$. A frequency vs. voltage curve is generated from $f_H$ to $f_L$ kHz The maximum in the lamp voltage corresponds to the frequency $f_{max}$, which is then utilized for color mixing.

In accordance with another embodiment of the invention, the amplitude modulated signal is turned "off" following the application of the amplitude modulated signal and the lamp voltage measurement.

In accordance with yet another embodiment of the invention a background subtraction mechanism is employed to compensate for short term fluctuations of the lamp voltage that are independent of amplitude modulation and color mixing effects. To this end, the lamp voltage measurements are performed such that the lamp voltage signal values with amplitude modulation "off" before and after mixing the amplitude modulated signal with the swept frequency signal, are averaged and subtracted from the lamp voltage with amplitude modulation mixing "on."

Once the color mixing frequency $f_{max}$ is determined, the frequency swept signal is mixed with an amplitude modulated signal having a frequency $f_H$ again. The amplitude modulation frequency is then decreased to frequency, $f_{max}$ and the modulation index a is increased to $a_{mix}$, which is a modulation index to be employed in color mixing mode.

In accordance with yet another embodiment of the invention an HID lamp is driven by two separate signals in a time sequential arrangement. Thus, the first signal comprises a fixed frequency signal at half the frequency of the second longitudinal mode resonance, followed by the second signal comprising a frequency sweep between the first azimuthal acoustic resonance mode and the first radial acoustic resonance mode. The second longitudinal mode frequency, $f_Y$, is derived by first setting a lower limit second longitudinal mode frequency $f_L$, and an upper limit second longitudinal mode frequency $f_H$.

The lamp is driven in a time sequential arrangement by first providing a fixed frequency signal having a frequency $f_H/2$ for a fixed period of time, x, followed by a frequency sweep for a period of time (t–x). The lamp voltage is then measured. The fixed frequency signal is then turned "off," by increasing the sweeping frequency signal for the full period of time, the fixed frequency $f_H$ is then decreased by a specified amount $\Delta f$ and then applied to the lamp again with the frequency swept current signal. The lamp voltage is repeatedly measured until the frequency of the fixed frequency signal reaches $f_L/2$. A frequency vs. voltage curve is generated from $f_H$ to $f_L$ kHz. The maximum in the lamp voltage corresponds to the frequency $f_{tsmax}$, which is then utilized for color mixing.

BRIEF DESCRIPTION OF THE DRAWINGS

FIG. 2b is a plot of the power frequency spectrum corresponding to the voltage frequency spectrum illustrated in FIG. 2a;

FIG. 3b is a plot of the power frequency spectrum corresponding to the voltage frequency spectrum illustrated in FIG. 3a;

FIG. 5b illustrates the time sequence for the amplitude modulated signal and voltage value measurements as described in reference with FIG. 5a;

DETAILED DESCRIPTION OF THE DRAWINGS

Figure 1:
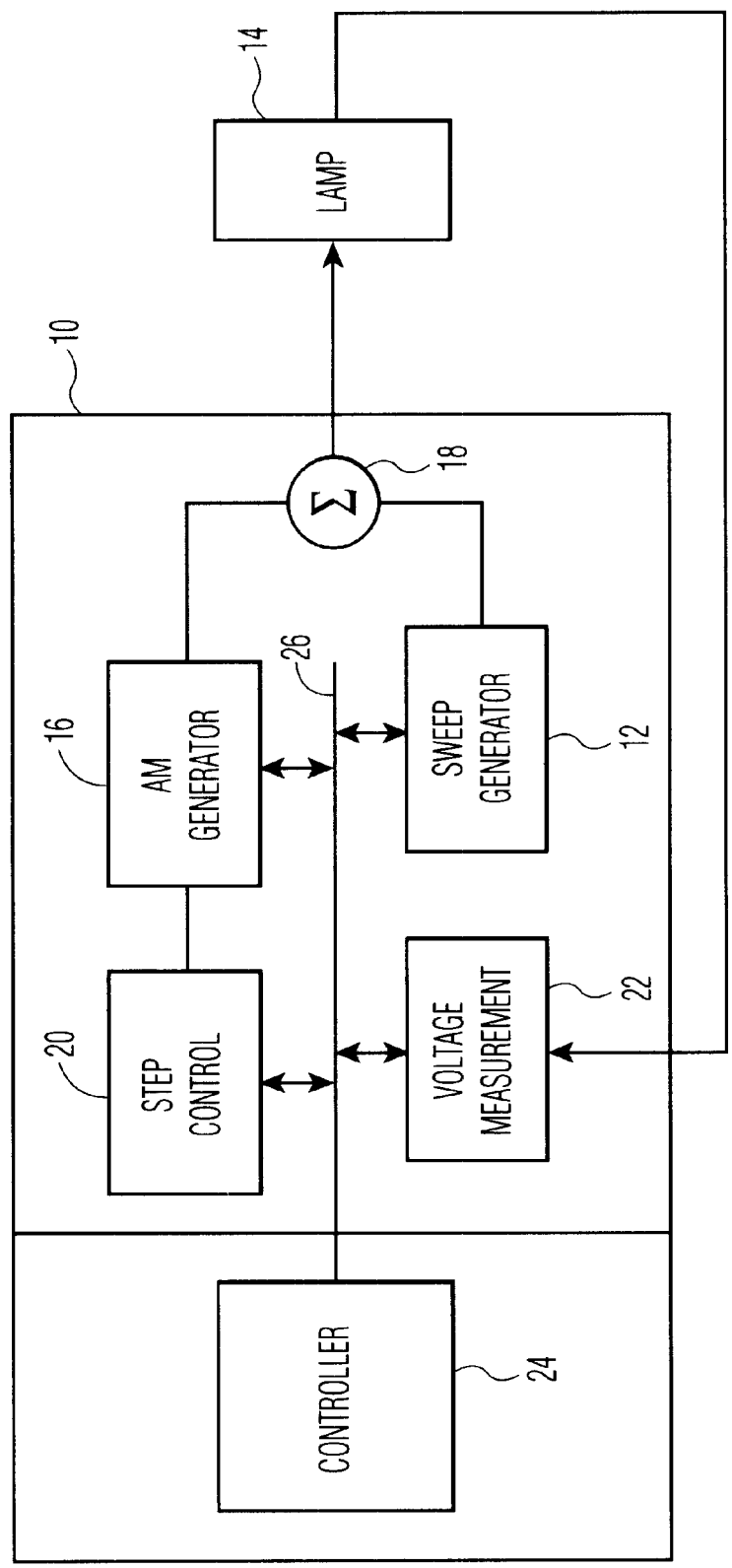
FIG. 1 illustrates a block diagram of a power source system employed to drive a gas discharge lamp in accordance with one embodiment of the invention.

FIG. 1 illustrates a power source system 10 in accordance with one embodiment of the invention, which is employed to generate a current driving signal that is provided to a gas discharge lamp 14 that operates without color segregation as described above.

Power source system 10 includes a controller 24, which is configured to determine the 2nd longitudinal mode frequency $f_Y$ corresponding to the 2nd longitudinal resonance mode for gas discharge lamp 14. Controller 24 may be any programmable device such as a microprocessor as well known by those skilled in the art. A bus 26 couples various components of power source system 10 to controller 24.

System 10 also includes a sweep generator 12, which is configured to provide a frequency sweep ranging between two frequency values. The output node of sweep generator 12 is coupled to an input node of a mixer 18. In accordance with one embodiment of the invention, these frequency values are greater than the first azimuthal acoustic resonance mode of lamp 14, and less than the first radial acoustic resonance mode of lamp 14. For a cylindrical lamp, the frequency for exciting the first azimuthal resonance mode is equal to $1.84 \times C_r/\pi \times D$, wherein $C_r$ is the average speed of sound in the radial plane and D is the inner diameter of lamp 14. Furthermore, the frequency for exciting the first radial acoustic resonance mode is equal to $3.83 * C_r/\pi \times D$ where $C_r$ is the average speed of sound in the radial plane and D is the inner diameter of lamp 14. The frequency range of the signal generated by sweep generator 12, typically ranges between 45 and 55 kHz, with a sweep time of 10 ms.

Although there are additional acoustic resonance modes between 45 and 55 kHz, the frequency sweep is sufficiently fast and the resonances sufficiently weak that the lamp remains substantially stable. Therefore, stable lamp operation can be obtained with a 10 kHz frequency sweep within a range between 40 kHz to about 70 kHz.

System 10 also include an amplitude modulation (AM) signal generator 16, which is configured to amplitude modulate the frequency sweep signal at desired frequencies. As illustrated in FIG. 1, the output node of signal generator 16 is coupled to the second input node of mixer 18. In accordance with one embodiment of the invention, a step control module 20 is coupled to signal generator 16 so as to increase or decrease the frequency of the amplitude modulated signal provided by generator 16 in defined incremental steps. It is noted that the function of step control module 20 can also be accomplished by controller 24 in accordance with other embodiments of the invention. Furthermore, the modulation index "a" of the amplitude modulated signal provided by generator 16 can be controlled by controller 24.

System 10 also includes a voltage measurement module 22, which is configured to measure the voltage of the gas discharge lamp 14 during a process for determining the 2nd longitudinal mode frequency required to excite the 2nd longitudinal mode resonance in lamp. To this end, the output node of mixer 18 is configured to provide a signal that drives lamp 14.

In the absence of amplitude modulation, lamp 14 is driven by a current signal having a sweep frequency $f \pm \Delta f$, with a corresponding power frequency located at $2f \pm 2 \Delta f$. The power frequency is important for exciting acoustic resonances. With the addition of amplitude modulation, the signal provided at the output node of mixer 18 is defined as $$\cos(2\pi(f \pm \Delta f)t) * [1 + a * \cos(2\pi f_Y t)]$$

where $f_Y$ is the frequency of the amplitude modulation signal and "a" is the modulation index wherein a<1. Squaring the amplitude modulated signal to get the power spectrum and keeping only terms in a, one gets power frequencies at $2f \pm 2\Delta f + f_Y$, $2\Delta f - f_Y$ and $f_Y$. The power at $f_Y$ is twice the power at $2f \pm 2\Delta f + f_Y$ or $2f \pm 2\Delta f - f_Y$. It is noted that even though the frequency is swept the power frequency at $f_Y$ remains fixed.

Figure 2A:
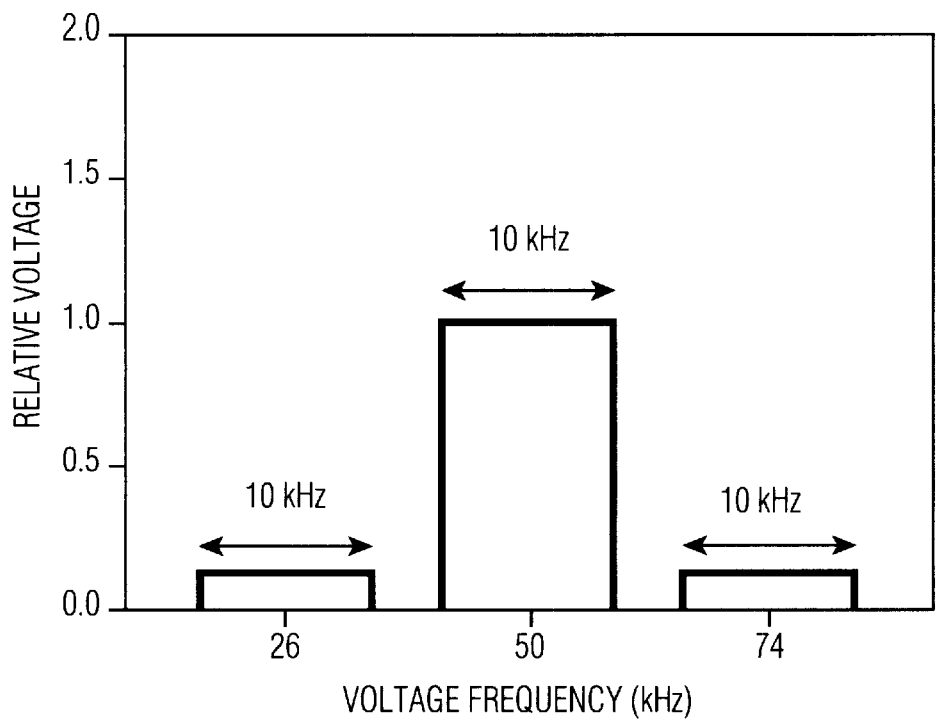
FIG. 2a is a plot of a voltage frequency spectrum of an amplitude modulated swept frequency signal for generating a 2nd longitudinal mode resonance in accordance with one embodiment of the invention.
Figure 2B:
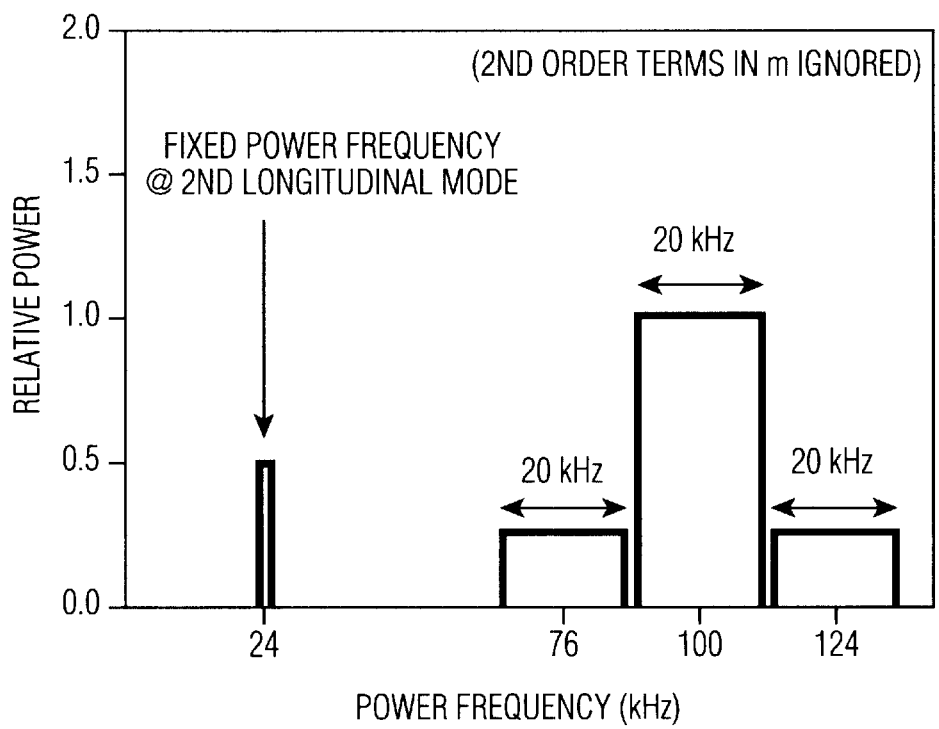

FIGS. 2a and 2b illustrate the frequency spectrum for an amplitude modulated signal provided by system 10 in accordance with one embodiment of the invention. Thus, FIG. 2a illustrates a voltage frequency vs. relative voltage graph of the amplitude modulated signal. In accordance with one embodiment of the invention, the sweep generator 12 provides a frequency swept signal ranging from 45 to 55 kHz as illustrated in FIG. 2a. The amplitude modulation signal provided by generator 16 has a frequency of 24 kHz and a modulation index of 0.25. As such the resultant signal at the output port of mixer 18 has a voltage frequency characteristics as depicted in FIG. 2a, wherein a center distribution between 45–55 kHz and two sidebands 10 kHz wide centered at 26 kHz and 74 kHz.

FIG. 2b represents the power frequency distribution, wherein a center distribution ranging from 90 kHz to 110 kHz and two sidebands 20 kHz wide, centered at 76 kHz and 124 kHz exist along with a fixed power frequency at the second longitudinal mode frequency of 24 kHz.

Figure 3A:
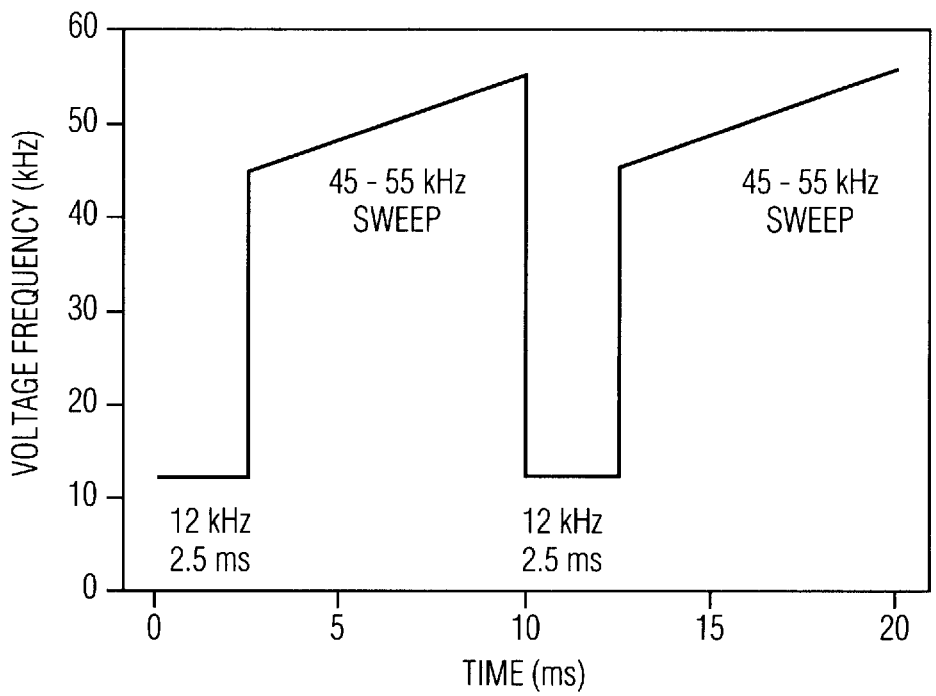
FIG. 3a is a plot of a voltage frequency spectrum of a time sequential signal for generating a 2nd longitudinal mode resonance in accordance with another embodiment of the invention.
Figure 3B:
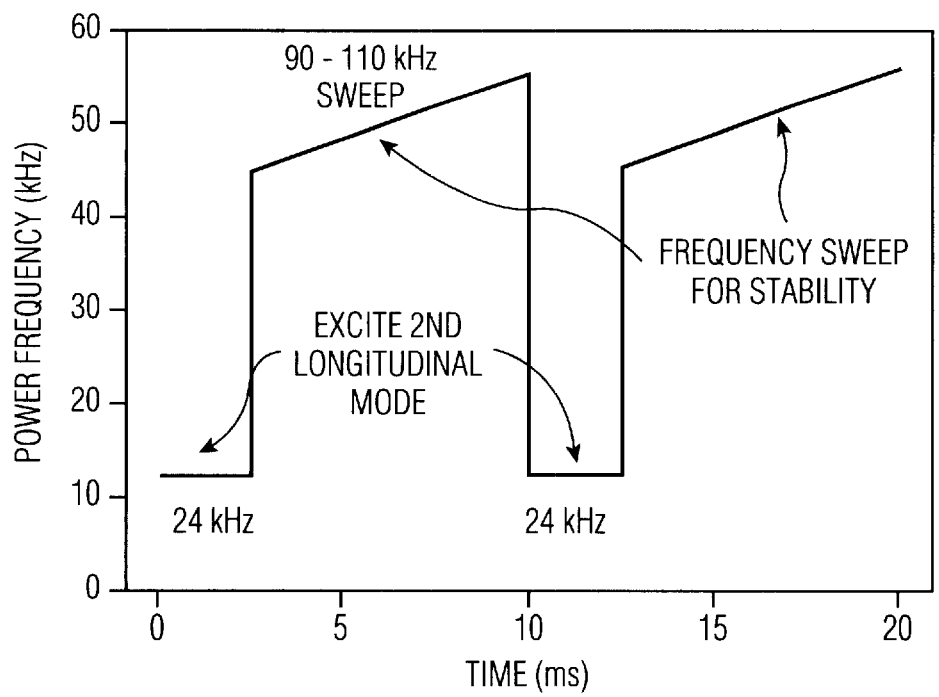

It is noted that in accordance with another embodiment of the invention, instead of mixing the swept frequency signal provided by generator 12 and amplitude modulation signal provided by generator 16, it is possible to drive lamp 14 by two separate signals on a time sequential arrangement, as illustrated in FIGS. 3a and 3b. To this end, sweep generator 12 is configured to generate a fixed frequency signal at half the frequency of the second longitudinal mode resonance, followed by a frequency sweep between the first azimuthal acoustic resonance mode and the first radial acoustic resonance mode as described above in reference with FIG. 2a. The cycle then repeats. In accordance with this embodiment of the invention, power is provided to lamp 14 without the need for amplitude modulation.

The power frequencies with a time sequential arrangement are at twice the swept frequencies and at twice the fixed current frequency. For example, when the current frequencies of 45 kHz to 55 kHz are provided, the power frequencies range from 90 kHz to 110 kHz. Furthermore, when a fixed frequency of 12.3 kHz is provided, the power frequency is at 24.6 kHz. These are the same power frequencies obtained with amplitude modulation, but without the 20 kHz wide AM sidebands centered at 76 kHz and 124 kHz.

Figure 4A:
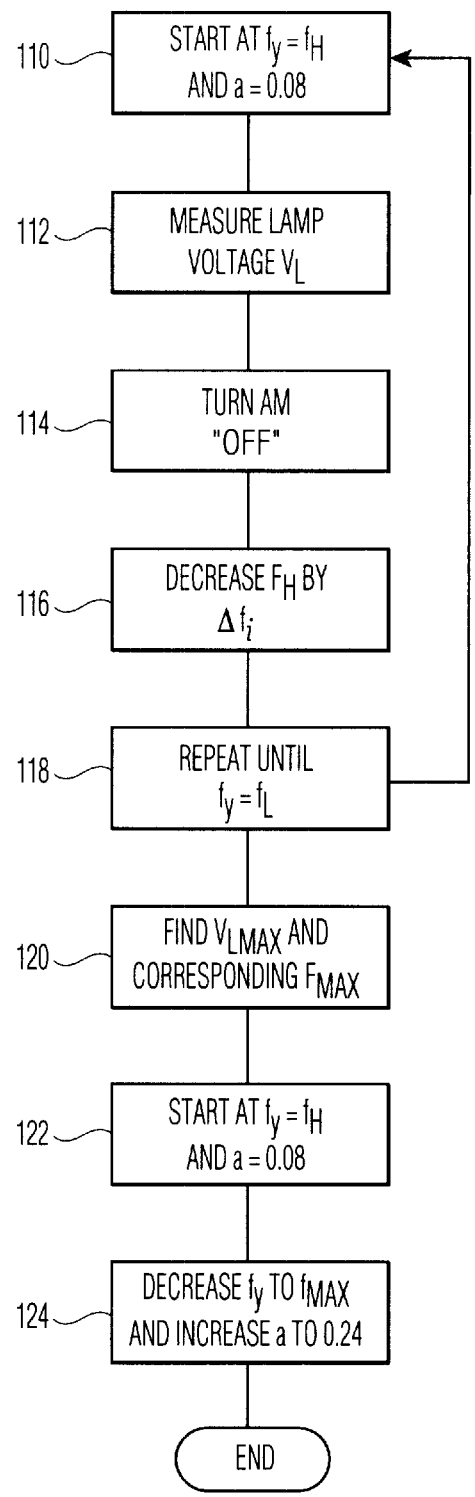
FIG. 4a is a flow chart of a process for determining the frequency for exciting the 2nd longitudinal mode resonance in a gas discharge lamp in accordance with one embodiment of the invention.

FIG. 4a is a flow chart of a process employed in accordance with one embodiment of the present invention to determine a 2nd longitudinal mode resonance frequency that substantially eliminates color segregation in lamp 14 (FIG. 1). Thus, at step 110, amplitude modulation generator 16 provides a signal at a frequency $f_H$, which is 27 kHz in accordance with one embodiment of the invention. The modulation index is a small amount, for example about 8%. The amount of modulation index must be low enough such that the lamp does not experience a substantial increase in its chemical ingredients, such as sodium. This follows because an increase in sodium depresses the lamp voltage and can even cause the lamp voltage value to go lower than its value without any amplitude modulation. Meanwhile, sweep generator 12 is providing a sweep frequency as explained above in reference with FIG. 1. At step 112, voltage measurement module 22 (FIG. 1) measures the lamp voltage at lamp 14, and provides the measured voltage value to controller 24 for storage. At step 114 the AM generator 16 is turned "off," so that no amplitude modulated signal is provided to lamp 14.

At step 116, the frequency $f_Y$ of AM generator 16 is decreased by an amount of $\Delta f$, for example 100 Hz. At step 118, the system repeats steps 110 through 118, until, the frequency $f_Y$ of AM generator 16 reaches its lower threshold limit, for example 21 kHz. The time that it takes for the system to measure the lamp voltage values for all the iterations spanning steps 110 through 118 is defined as the scan period. Typically, each scan period takes about one minute, wherein for half a second AM generator is "on," and for half a second AM generator is "off," and about 60 frequency steps are measured.

At step 120, controller 24 determines the maximum lamp voltage value corresponding to the frequency $f_Y = f_{MAX}$ that corresponds to the amplitude modulated frequency that generated this maximum lamp voltage value. Controller 24, thereafter assigns the frequency value, $F_{MAX}$, as the 2nd longitudinal mode frequency for lamp 14.

During operation of the lamp, at step 122, the lamp is operated with an amplitude modulated frequency $f_Y = f_H$, which is the upper limit of the amplitude modulated frequency, for example 27 kHz. At step 124, the frequency $f_Y$ is decreased to $f_{MAX}$ without turning off the AM generator. Advantageously, the frequency $f_Y$ is decreased by $\Delta f$ every half a second. Thereafter, the modulation index of AM generator 16 is increased to a higher value, for example 24%. It is noted that in accordance with one embodiment of the invention, the frequency $f_{MAX}$ may be decreased by an additional specified amount, for example 1kHz because of the shift of the 2nd longitudinal mode frequency. As stated before, with an increased modulation index, certain ingredients of the lamp may increase, such as sodium, which can decrease the frequency of the $_2$nd longitudinal mode.

Figure 4B:
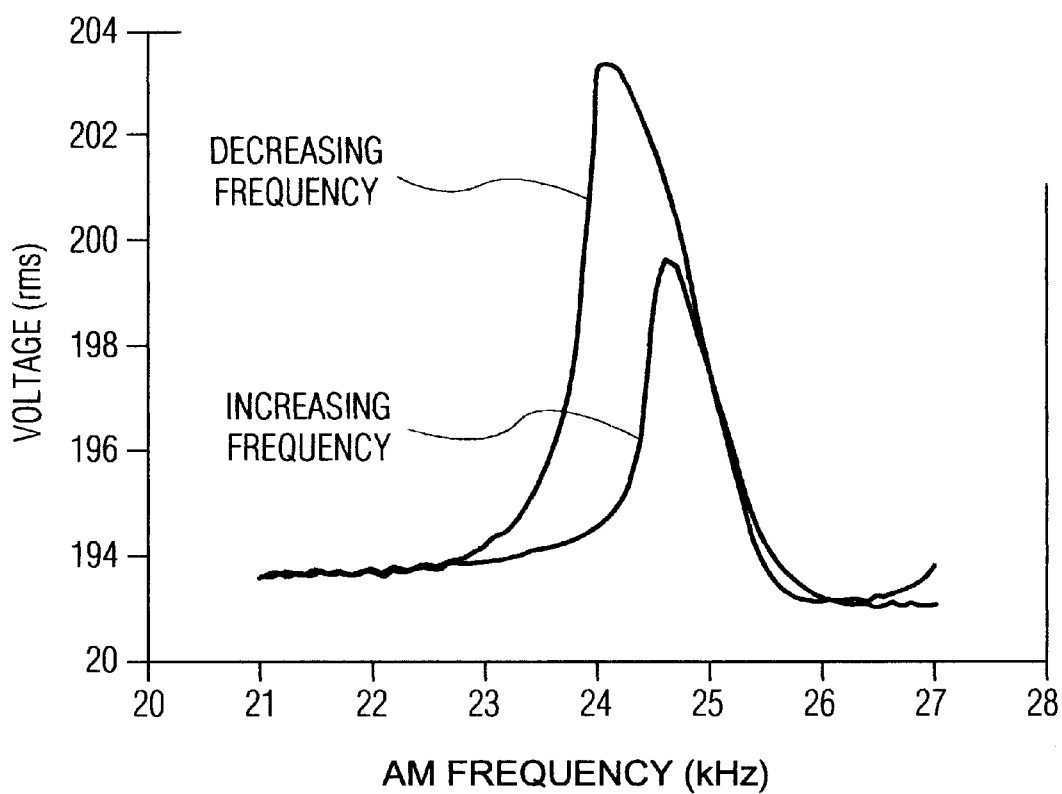
FIG. 4b illustrates the lamp voltage vs amplitude modulation (AM) frequency curves with frequency of the amplitude modulated signal either increasing or decreasing from one limit to the other in order to determine the 2nd longitudinal mode frequency in accordance with one embodiment of the invention.

It is also noted that although the flow chart in FIG. 4a illustrates a process that starts with a high frequency modulated signal, $f_H$, it is also possible to start the process with the lower limit frequency modulated signal, $f_L$, and increase the frequency steps to obtain the maximum voltage value at lamp 14. As such FIG. 4b illustrates a lamp voltage vs. AM frequency curve comparing a process employing decreasing frequency with a process employing increasing frequency. In accordance with one embodiment of the invention, the curves in FIG. 4b were generated, wherein during steps 110 through 118 of FIG. 4a, the modulation index was set at about 9.6%, with a frequency step $\Delta f$ of 100 Hz, and the AM generation being "on" for 0.1 second and being "off" for 0.1 second.

In accordance with another embodiment of the invention, in order to determine the appropriate amplitude modulation frequency to generate the 2nd longitudinal mode resonance a background subtraction arrangement is utilized. In some instances, some lamps exhibit short term fluctuations in the lamp voltage value during the scan period, which is independent of amplitude modulation and color mixing effects. The background subtraction arrangement in accordance with the present invention, compensates for such short term fluctuations during the scan period.

Figure 5A:
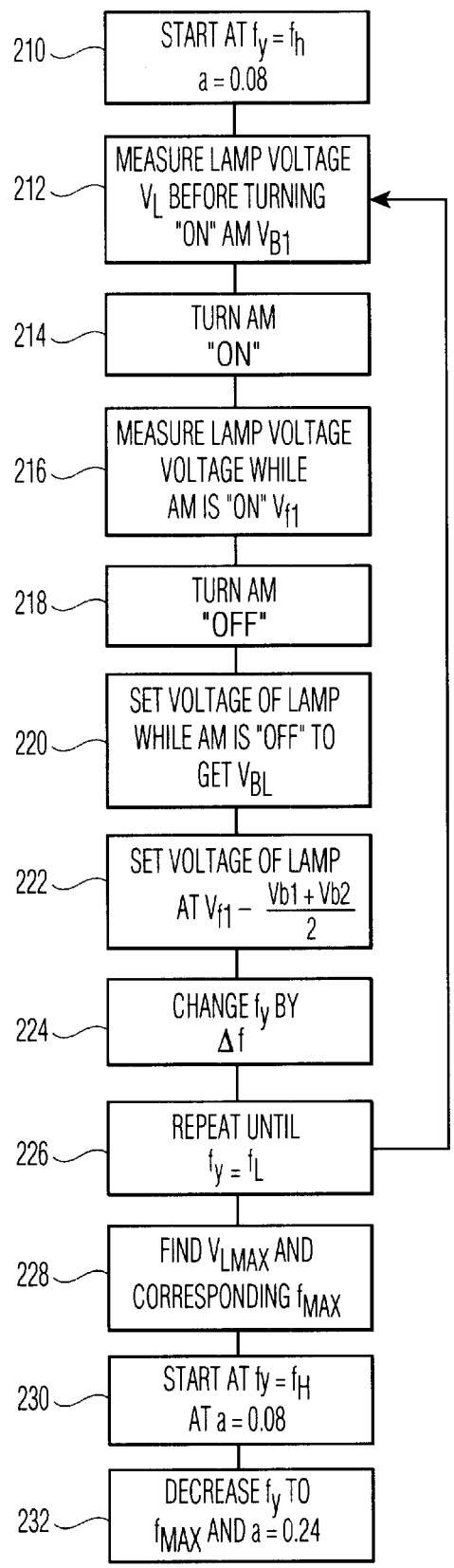
FIG. 5a is a flow chart of a process for determining the frequency for exciting the 2nd longitudinal mode resonance in a gas discharge lamp, employing a background subtraction arrangement, in accordance with another embodiment of the invention.

FIG. 5a is a flow chart that illustrates the background subtraction arrangement in accordance with one embodiment of the present invention. In accordance with this embodiment of the invention, lamp voltage values with AM generator "off," before and after each amplitude modulation measurement, are averaged and subtracted from the lamp voltage value with AM generator "on."

As a result, at step 210, the frequency, $f_Y$ of AM generator 16 (FIG. 1) is set to its upper limit $f_H$, with a sufficiently small modulation index, for example 8%. At step 212, the lamp voltage $V_{b1}$ is measured before providing the amplitude modulated signal to mixer 18, or before turning "on" AM generator 16. At step 214, AM generator 16 is turned "on", so that at step 218 the lamp voltage value $V_{f1}$ is measured while an amplitude modulated signal is provided to mixer 18.

At step 218, the AM generator is turned "off" again, and the lamp voltage value $V_{b2}$ is measured while no amplitude modulated signal is provided to mixer 18. At step 222, controller 24, for the corresponding frequency $f_Y$, stores a lamp voltage value defined as $$V_{f1} - [(V_{b1} + V_{b2})/2].$$

At step 224, the frequency $f_Y$ of AM generator 16 is decreased by a specified amount $\Delta f$, for example 100 Hz. At step 226, the process described by steps 212 through 222 are repeated, until the frequency $f_Y$ of AM generator 16 reaches its lower limit $f_L$.

At step 228, controller 24 determines the maximum stored lamp voltage as defined at step 222, and the corresponding frequency $f_Y = F_{MAX}$, which represents the second longitudinal mode resonance frequency. The process is then completed by the following steps.

Figure 5B:
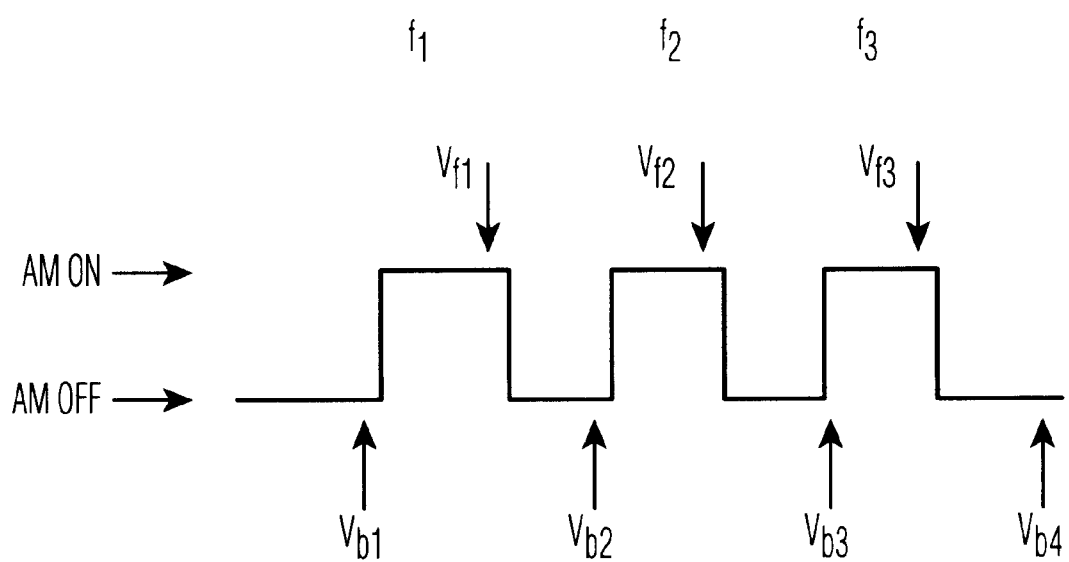

At step 230, lamp 14 was driven again with a current signal generated by sweep generator 12 and AM generator 16, with a frequency $f_Y = f_H$ and a modulation index of about 8%. Thereafter, frequency $f_Y$ is decreased by $\Delta f$ every half a second at step 232 to $f_{Max}$ and the modulation index is increased to about 24% as described earlier in reference with FIG. 4a. FIG. 5b illustrates the time sequence for the amplitude modulated signal and voltage value measurements as described in reference with FIG. 5a.

Figure 6A:
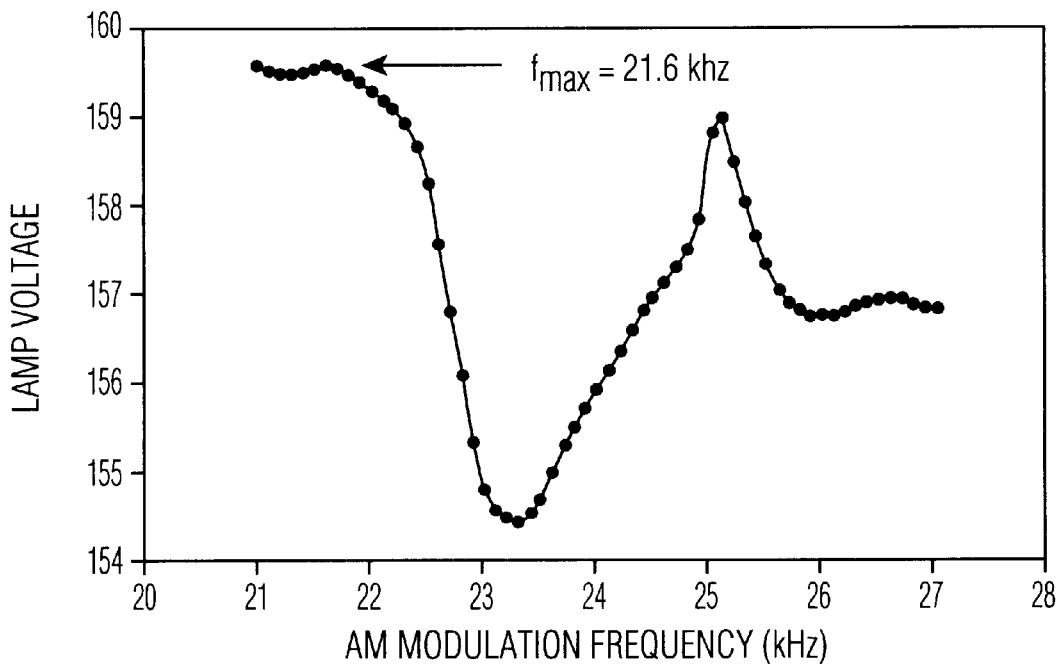
FIGS. 6a and 6b illustrates the voltage vs amplitude modulation (AM) frequency curves with and without background subtraction arrangement in accordance with one embodiment of the invention.
Figure 6B:
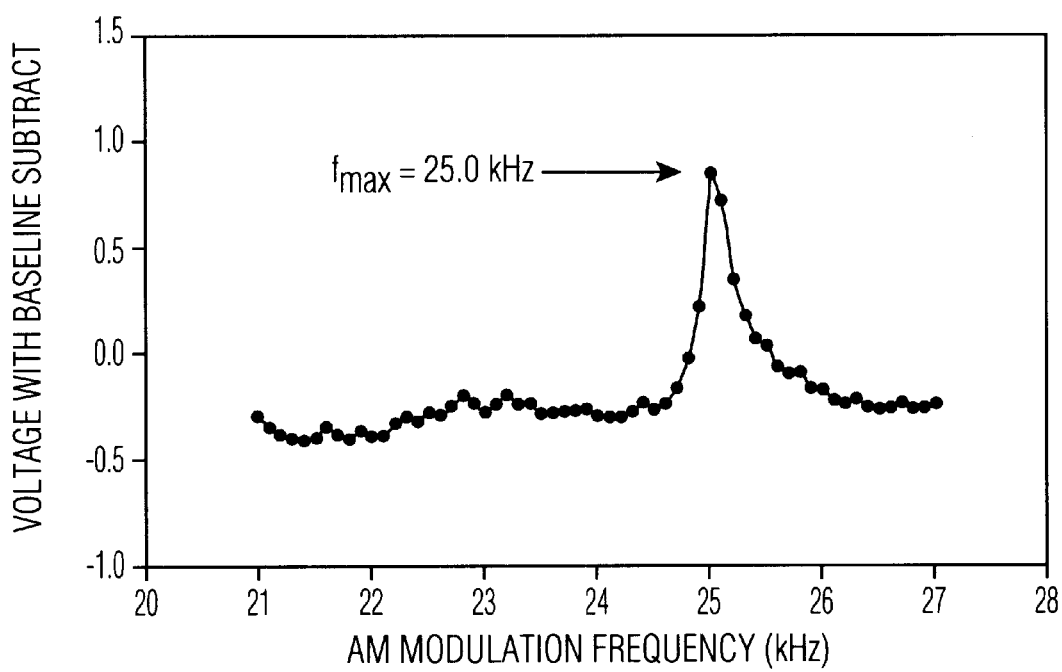

FIGS. 6a and 6b is a plot of lamp voltage values as a function of AM frequency $f_Y$ for a lamp 14 operated vertically. The lamp voltage varies from 154.4 Volts to 159.6 Volts. The maximum voltage occurs at 21.6 kHz. With background subtraction arrangement of the same data, the maximum voltage shifts to 25 kHz. It is noted that without background subtraction, the graph illustrates two crests at 25 KHz and 21.6 Khz. However, color mixing would not have been possible at 21.6 KHz because this frequency is below the 2nd longitudinal mode resonance frequency.

Figure 7:
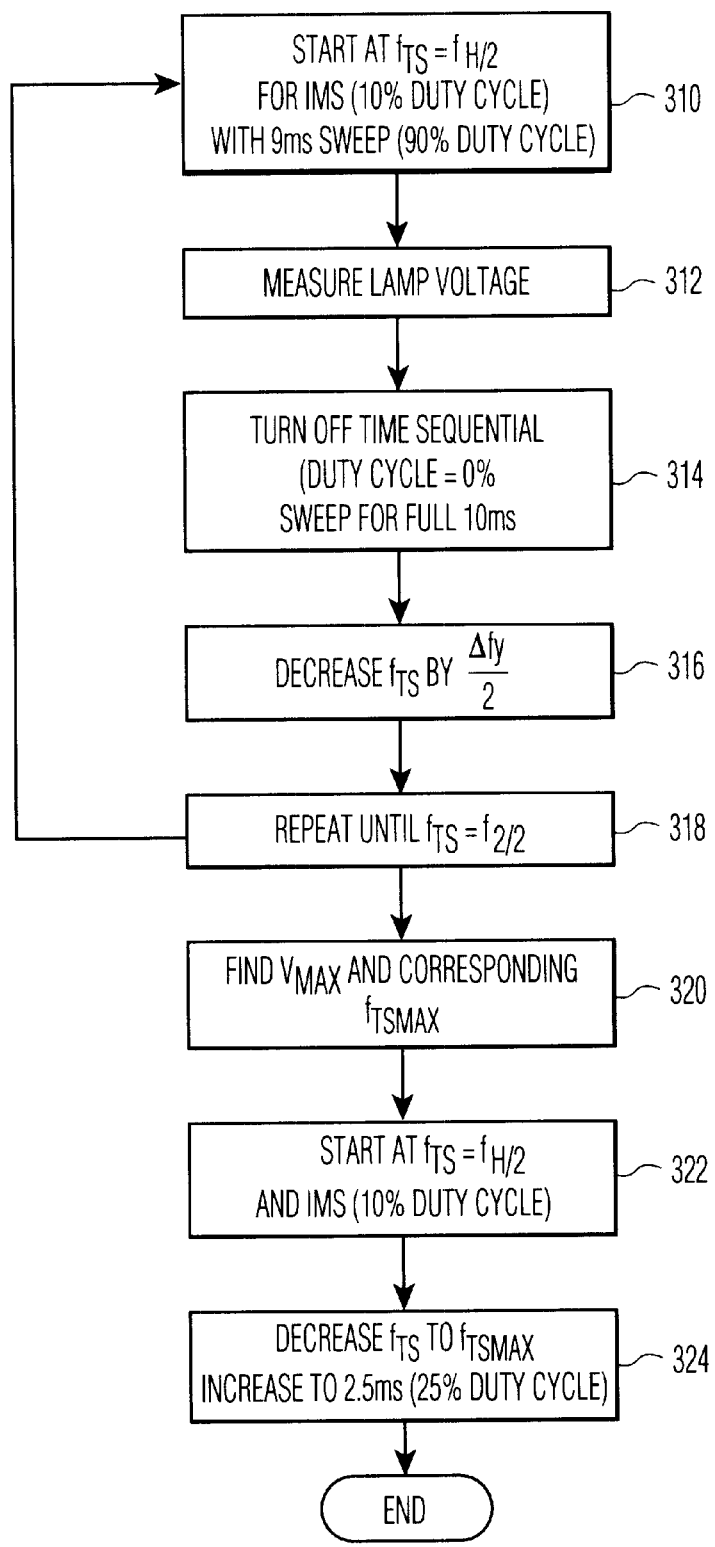
FIG. 7 is a flow chart of a process for determining the frequency for exciting the $2^{nd}$ longitudinal mode resonance in a gas discharge lamp, employing a time sequential arrangement.

FIG. 7 is a flow chart of a process employed in accordance with one embodiment of the present invention to determine a 2nd longitudinal mode resonance frequency based on a time sequential arrangement so as to substantially eliminate color segregation in lamp 14 (FIG. 1). Thus, at step 310, a fixed frequency signal is provided for about 1 ms at a frequency $f_{TS} = f_H/2$, followed by a frequency sweep from 45 to 55 kHz for 9 ms. $f_H/2$ equals 13.5 kHz in accordance with one embodiment of the invention. The period that the fixed frequency signal is provided is a small ratio of the entire period of the signal that is provided to lamp 14, for example about 10%. At step 312, voltage measurement module 22 (FIG. 1) measures the lamp voltage at lamp 14, and provides the measured voltage value to controller 24 for storage. At step 314 the fixed frequency signal is turned "off," by increasing the sweep frequency duration to the total period of 10 ms.

At step 316, the frequency $f_{TS}$ of fixed frequency signal is decreased by an amount of $\Delta f$, for example 50 Hz. At step 318, the system repeats steps 310 through 318, until, the frequency $f_{TS}$ reaches its lower threshold limit, for example 21/2 kHz or 10.5 kHz.

At step 320, controller 24 determines the maximum lamp voltage value corresponding to the frequency $f_{TS} = f_{TSMAX}$ that corresponds to the fixed frequency signal that generated this maximum lamp voltage value. Controller 24, thereafter assigns the frequency value, $f_{TSMAX}$, as the current frequency corresponding to the 2nd longitudinal mode frequency for lamp 14.

During operation of the lamp, at step 322, the lamp is operated with a fixed frequency signal having frequency $f_{TS} = f_H/2$ which is the upper limit of the amplitude modulated frequency, for example 13.5 kHz for 1 ms, or about 10% duty cycle. At step 324, the frequency $f_{TS}$ is decreased in 50 Hz to $f_{TSMAX}$ without turning off the fixed frequency. The fixed frequency portion of the time sequential signal after reaching $f_{TSMAX}$ during this phase of operation is set at 2.5 ms or about 25% duty cycle. It is further noted that the background subtraction method discussed above is employed in the time sequential arrangement as well, in accordance with another embodiment of the invention.

Thus, in accordance with various embodiments of the present invention, a high intensity discharge lamp may be operated with substantially small color segregation by determining the appropriate 2nd longitudinal mode frequency, which corresponds to a maximum lamp voltage operation. By employing the process explained based on the principles of the present invention, it is possible to determine the 2nd longitudinal mode frequency conveniently and accurately for any HID lamp, regardless of the lamp's geometry or chemistry.

What is claimed is:

1. A power source system for providing color mixing in a high intensity discharge (HID) lamp comprising:
   a sweep signal generator configured to provide a swept frequency signal having a sweeping frequency ranging between a first lower frequency value and a second higher frequency value, within a specified period
   an amplitude modulation signal generator configured to provide an amplitude modulation signal having an adjustable frequency value and an adjustable modulation index
   a mixer coupled to said sweep signal generator and said amplitude modulation signal generator such that said swept frequency signal is amplitude modulated by said amplitude modulation signal, said amplitude modulated swept frequency signal being configured to drive said lamp; and
   a controller configured to adjust the frequency of said amplitude modulation signal to substantially eliminate color segregation in said lamp.

2. A power source system in accordance with claim 1 further comprising a voltage measurement module coupled to said lamp for measuring the voltage value of said lamp in response to variation of frequency of said amplitude modulation signal.

3. A power source system in accordance with claim 2, wherein said controller is further configured to store said lamp voltage values measured in response to variation of frequency of said amplitude modulation signal.

4. The power source system in accordance with claim 3 wherein said lamp during operation is driven by a signal corresponding to an amplitude modulation frequency that yields a maximum lamp voltage value.

5. The power source system in accordance with claim 4 wherein said amplitude modulation frequency that yields a maximum lamp voltage value represents second longitudinal mode frequency of said lamp.

6. The power source system in accordance with claim 5 wherein said first lower frequency value of said swept frequency signal is greater than first azimuthal acoustic resonance mode frequency of said lamp, and said second higher frequency value of said swept frequency signal is less than first radial acoustic resonance mode frequency of said lamp.

7. The power source system in accordance with claim 3, wherein modulation index of said amplitude modulation signal is substantially low such that said lamp does not experience a substantial increase in its chemical ingredients.

8. The power source system in accordance with claim 7 wherein said amplitude modulation signal generator is turned "off" between each measurement of said lamp voltage.

9. The power source system in accordance with claim 8 wherein said controller is further configured to measure said lamp voltage values in accordance with a background subtraction arrangement.

10. In a power source system, a method for providing color mixing in a high intensity discharge (HID) lamp comprises the steps of:
   providing a swept frequency signal having a sweeping frequency ranging between a first lower frequency value and a second higher frequency value, within a specified period;
   providing an amplitude modulation signal having an adjustable frequency value and an adjustable modulation index
   amplitude modulating said swept frequency signal by said amplitude modulation signal, such that said amplitude modulated swept frequency signal drives said lamp; and
   adjusting the frequency of said amplitude modulation signal to substantially eliminate color segregation in said lamp.

11. The method in accordance with claim 10 further comprising the step of measuring voltage values of said lamp in response to variation of frequency of said amplitude modulation signal.

12. The method in accordance with claim 11, further comprising the step of storing said lamp voltage values measured in response to variation of frequency of said amplitude modulation signal.

13. The method in accordance with claim 12 further comprising the step of driving said lamp, during operation, by a signal corresponding to an amplitude modulation frequency that yields a maximum lamp voltage value.

14. The method in accordance with claim 12 further comprising the step of assigning as second longitudinal mode frequency of said lamp, the value of said amplitude modulation frequency that yields said maximum lamp voltage value.

15. The method in accordance with claim 14 further comprising the step of assigning azimuthal acoustic resonance mode frequency of said lamp as said first lower frequency value of said swept frequency signal, and assigning first radial acoustic resonance mode frequency of said lamp as said second higher frequency value of said swept frequency signal.

16. The method in accordance with claim 15 further comprising the step of turning "off" said amplitude modulation signal between each measurement of said lamp voltage.

17. The method in accordance with claim 16 further comprising the step of conducting background subtraction when measuring said lamp voltage values.

18. In a power source system, a method for providing color mixing in a high intensity discharge (HID) lamp comprises the steps of:
   (a) providing a swept frequency signal having a sweeping frequency ranging between a first lower frequency value and a second higher frequency value, within a specified period;
   (b) providing an amplitude modulation signal having an adjustable frequency value ranging between an upper frequency value and a lower frequency value and an adjustable modulation index, said amplitude modulation signal having one of said upper frequency and lower frequency value,
   (c) amplitude modulating said swept frequency signal by said amplitude modulation signal, said amplitude modulated swept frequency signal driving said lamp;
   (d) adjusting the frequency of said amplitude modulation signal in incremental steps;
   (e) measuring the voltage value of said lamp after each adjustment;
   (f) repeating said adjustment and measurement steps until the frequency of said amplitude modulation signal reaches its other limit; and
   (g) selecting a frequency value for said amplitude modulation signal that yields the maximum lamp voltage value.

19. The method according to claim 18 wherein said step of providing amplitude modulation signal further comprises the step of setting the frequency of said amplitude modulation signal at said upper limit and said step of adjusting further comprises the step of decreasing said amplitude modulation signal at said incremental steps.

20. The method according to claim 19 wherein said step of providing a swept frequency signal further comprises the step of assigning azimuthal acoustic resonance mode frequency of said lamp as said first lower frequency value of said swept frequency signal, and assigning first radial acoustic resonance mode frequency of said lamp as said second higher frequency value of said swept frequency signal.

21. The method according to claim 20 further comprising the step of turning said amplitude modulation signal "off" after each measurement of said lamp voltage, and turning said amplitude modulation signal "on" before each measurement of said lamp voltage.

22. The method according to claim 21 further comprising the step of setting the modulation index of said amplitude modulation signal at a substantially low value such that concentration of chemical ingredients in said lamp do not increase substantially.

23. The method according to claim 22 where in after selecting said amplitude modulating frequency corresponding to said maximum lamp voltage value, the method further comprises the step of driving said lamp again with said amplitude modulating signal having said upper limit value and decreasing said upper limit frequency to said selected amplitude modulating frequency corresponding to said maximum lamp voltage value.

24. The method according to claim 23 further comprising the step of increasing said modulation index after said amplitude modulating signal exhibits said selected amplitude modulating frequency.

25. The method according to claim 24, further comprising the step of background subtracting lamp voltage values before and after each of said measurements, such that a lamp voltage for each measurement is assigned as $$V_{f1}-[(V_{b1}+V_{b2})/2],$$

wherein $V_{f1}$ is the lamp voltage when said amplitude modulation signal is "on", and $V_{b1}$ is the lamp voltage before said modulation signal is "on," and $V_{b2}$ is the lamp voltage when said amplitude modulation signal is tuned "off" again.

26. In a power source system, a method for providing color mixing in an HID lamp comprising the steps of:

providing an input signal in a time sequential arrangement, said signal having a first signal component configured as a swept frequency signal within a first period having a sweeping frequency ranging between a first lower frequency value and a second higher frequency value;

providing a second signal component configured as a constant frequency signal during a second period;

driving said lamp with said first signal component and said second signal component in a time sequential arrangement; and adjusting the frequency of said constant frequency signal to substantially eliminate color segregation in said HID lamp.

27. The method in accordance with claim 26 further comprising the step of measuring voltage values of said lamp in response to variation of said constant frequency signal.

28. The method in accordance with claim 27, further comprising the step of storing said lamp voltage values measured in response to variation of said constant frequency signal.

29. The method in accordance with claim 28 further comprising the step of driving said lamp, during operation, by a signal corresponding to said constant frequency signal that yields a maximum lamp voltage value.

30. The method in accordance with claim 28 further comprising the step of assigning as second longitudinal mode frequency of said lamp, the value of twice the constant frequency of said fixed frequency signal that yields said maximum lamp voltage value.

31. The method in accordance with claim 20 further comprising the step of assigning azimuthal acoustic resonance mode frequency of said lamp as said first lower frequency value of said swept frequency signal, and assigning first radial acoustic resonance mode frequency of said lamp as said second higher frequency value of said swept frequency signal.

32. The method in accordance with claim 31 further comprising the step of turning "off" said fixed frequency signal between each measurement of said lamp voltage.

33. The method in accordance with claim 31 further comprising the step of conducting background subtraction when measuring said lamp voltage values .

* * * * *